United States Patent [19]

Tomono et al.

[11] Patent Number: 4,567,233

[45] Date of Patent: Jan. 28, 1986

[54] HEAT AND IMPACT RESISTANT RESIN COMPOSITION

[75] Inventors: Hiromi Tomono, Yokkaichi; Takashi Kokubo, Suzuka; Kazuki Yamaguchi, Yokkaichi; Sadao Ikuma, Suzuka, all of Japan

[73] Assignee: Mitsubishi Monsanto Chemical Company, Tokyo, Japan

[21] Appl. No.: 575,298

[22] Filed: Jan. 30, 1984

[30] Foreign Application Priority Data

Jun. 15, 1983 [JP] Japan .............................. 58-107305

[51] Int. Cl.$^4$ ...................... C08L 51/04; C08L 53/04
[52] U.S. Cl. ......................................... 525/71; 525/73
[58] Field of Search ...................................... 525/71, 73

[56] References Cited

U.S. PATENT DOCUMENTS 4,381,373  4/1983  Ikuma .................................... 525/71
4,404,322  9/1983  Saito et al. ............................ 525/73

*Primary Examiner*—Jacob Ziegler
*Attorney, Agent, or Firm*—Oblon, Fisher, Spivak, McClelland & Maier

[57] ABSTRACT

A heat and impact resistant resin composition which comprises from 10 to 90 parts by weight of a copolymer (A) comprising from 90 to 50% of residues of a vinyl aromatic compound, from 10 to 50% of residues of a maleimide compound and from 0 to 30% of residues of a vinyl compound copolymerizable therewith; from 0 to 50 parts by weight a copolymer (B) comprising from 90 to 40% of residues of a vinyl aromatic compound and from 10 to 60% of residues of an unsaturated nitrile compound; from 5 to 89 parts by weight of a graft copolymer (C) comprising from 25 to 70% by weight of particles of a rubber having a glass transition temperature of not higher than 0° C. and an average particle size of from 0.1 to 0.5 $\mu$m and from 75 to 30% by weight of a matrix resin comprising from 90 to 40% of residues of a vinyl aromatic compound and from 10 to 60% of residues of an unsaturated nitrile compound; and from 1 to 45 parts by weight of a graft copolymer (D) comprising from 2 to 17% by weight of particles of a rubber having a glass transition temperature of not higher than 0° C. and an average particle size of from 0.7 to 4 $\mu$m and from 98 to 83% by weight of a matrix resin comprising from 90 to 40% of residues of a vinyl aromatic compound and from 10 to 60% of residues of an unsaturated nitrile compound, wherein the amount of the graft copolymer (C) is from 97 to 50% by weight of the total amounts of the graft copolymers (C) and (D).

7 Claims, No Drawings

HEAT AND IMPACT RESISTANT RESIN COMPOSITION

The present invention relates to a heat resistant resin composition which is superior in its heat stability and impact resistance, particularly in its falling dart impact strength (hereinafter referred to simply as "FDI").

It is known that a composition obtained by blending a styrene-maleic anhydride copolymer (hereinafter referred to simply as "SMA") with an acrylonitrile-butadiene-styrene resin (hereinafter referred to as "ABS resin"), has a high deformation-temperature under heat and excellent Izod impact strength and solvent resistance. However, this composition is inferior in the heat stability at a high temperature. For instance, when heated to a temperature of 230° C. or higher, it undergoes foaming, weight reduction or cross linking. Accordingly, it used to be difficult to mold it by a common injection molding technique. As a method for solving this problem, it has been proposed to imidize the maleic anhydride residues in SMA. (Japanese Unexamined Patent Publication No. 98536/1982 and No. 131213/1982) A blend of a styrene-maleimide copolymer with an ABS resin obtained by this method, is superior in its heat stability at a high temperature and has good heat resistance, Izod impact strength and solvent resistance. However, such a blend of a styrene-maleimide copolymer with an ABS resin has been found to have a drawback that it is inferior in the practical strength represented by FDI. Namely, it has a difficulty that in spite of the high Izod impact strength, its FDI is low. In an attempt to improve the FDI of such a composition, it has been proposed to select the optimum stock temperature and mold temperature to prevent the re-orientation of the dispersed rubber particles during the molding operation, or to slow down the solidifying velocity of resin at the mold surface by adding a small amount of a plasticizer. However, no remarkable effect has been obtained in either case.

The present inventors have conducted extensive researches with an aim to solve the difficulty inherent to such a blend of a styrene-maleimide copolymer with an ABS resin, and have found that it is possible to solve the above mentioned problem by using as the ABS resin a combination of a first rubber component prepared by emulsion polymerization and having an average particle size of from 0.1 to 0.5 $\mu$m and a second rubber component prepared by mass or mass-suspension polymerization and having an average particle size from 0.7 to 4.0 $\mu$m. The present invention has been accomplished based on this discovery.

Thus, it is an object of the present invention to provide a heat resistant resin composition which is superior in its heat stability and impact resistance, particularly in its FDI.

Such an object of the present invention can be attained by a heat and impact resistant resin composition which comprises from 10 to 90 parts by weight of a copolymer (A) comprising from 90 to 50% of residues of a vinyl aromatic compound, from 10 to 50% of residues of a maleimide compound and from 0 to 30% of residues of a vinyl compound copolymerizable therewith; from 0 to 50 parts by weight a copolymer (B) comprising from 90 to 40% of residues of a vinyl aromatic compound and from 10 to 60% of residues of an unsaturated nitrile compound; from 5 to 89 parts by weight of a graft copolymer (C) comprising from 25 to 70% by weight of particles of a rubber having a glass transition temperature of not higher than 0° C. and an average particle size of from 0.1 to 0.5 $\mu$m and from 75 to 30% by weight of a matrix resin comprising from 90 to 40% of residues of a vinyl aromatic compound and from 10 to 60% of residues of an unsaturated nitrile compound; and from 1 to 45 parts by weight of a graft copolymer (D) comprising from 2 to 17% by weight of particles of a rubber having a glass transition temperature of not higher than 0° C. and an average particle size of from 0.7 to 4 $\mu$m and from 98 to 83% by weight of a matrix resin comprising from 90 to 40% of residues of a vinyl aromatic compound and from 10 to 60% of residues of an unsaturated nitrile compound, wherein the amount of the graft copolymer (C) is from 97 to 50% by weight of the total amounts of the graft copolymers (C) and (D).

In this specification, the content of the residues of each compound in the respective copolymer is represented by percentage of the number of the residues of that compound in the total number of residues in the copolymer.

Now, the present invention will be described in detail with reference to the preferred enbodiments.

As the vinyl aromatic compound used in the present invention, styrene is most common, but $\alpha$-methylstyrene, p-methylstyrene, t-butylstyrene, a halogenated styrene or a mixture thereof may also be employed. As the maleimide compound, N-phenylmaleimide is most common, but maleimide, an N-alkylmaleimide, an N-arylmaleimide or a mixture thereof may also be employed. As the vinyl compound copolymerizable with the vinyl aromatic compound and the maleimide compound to be used for the copolymer (A), acrylonitrile, an acrylate, a methacrylate, maleic anhydride or a mixture thereof is usually employed. As the unsaturated nitrile compound for the copolymers (B), (C) and (D), acrylonitrile is usually employed, but methacrylonitrile or a mixture of acrylonitrile and methacrylonitrile may also be employed. As the rubber having a glass transition temperature of not higher than 0° C. used for the copolymers (C) and (D), there may be mentioned polybutadiene, a styrene-butadiene copolymer, an acrylonitrile-butadiene copolymer, a homopolymer or copolymer of an alkyl acrylate, such as polybutyl acrylate, polypentyl acrylate or polyhexyl acrylate, an ethylene-propylene copolymer, and an ethylene-propylene-nonconjugated diene terpolymer.

The amount of the maleimide compound residues contained in the copolymer (A) is from 10 to 50%. If the amount is less than 10%, the heat resistance will be inadequate. On the other hand, if the amount exceeds 50%, the preparation of the copolymer will be difficult. The rest of the copolymer (A) is composed of residues of the vinyl aromatic compound and, if necessary, at most 30% of residues of the vinyl compound copolymerizable with the maleimide and vinyl aromatic compounds.

The copolymer (A) is prepared by subjecting predetermined amounts of the compounds to mass polymerization, suspension polymerization or mass-suspension polymerization. It is also possible to produce the copolymer (A) by polymerizing maleic anhydride instead of the maleimide compound, with e.g. a vinyl aromatic compound and imidizing the resulting copolymer with ammonia, aniline or other primary amine.

The copolymer (B) contains from 10 to 60% of the unsaturated nitrile compound residues. If the amount of the unsaturated nitrile compound residues is less than 10% or greater than 60%, the compatibility of the copolymer (B) with the copolymer (A) will be deteriorated, whereby the heat resistance and impact resistance of the final composition will be poor.

The copolymer (B) is prepared by subjecting predetermined amounts of the respective compounds to mass polymerization, suspension polymerization or mass-suspension polymerization.

The copolymer (C) is usually prepared by the emulsion polymerization of the vinyl aromatic compound and the unsaturated nitrile compound in the presence of a rubber latex. The glass transition temperature of the rubber should properly be at most 0° C. If the glass transition temperature is higher than 0° C., the mechanical properties of the final composition at a low temperature will be inferior.

Further, it is desired that the average particle size of the rubber is within a range of from 0.1 to 0.5 μm. If the particle size is less than 0.1 μm, the mechanical properties, such as the impact resistance, of the final composition will be poor. On the other hand, if the average particle size exceeds 0.5 μm, the stability of the rubber latex as the starting material will be deteriorated, whereby the emulsion polymerization becomes difficult. The "average particle size" of the rubber in the copolymer (C) is a number average particle size of from 200 to 1000 rubber particles as obtained from the transmission electron microscopic photograph of a test sample treated with osmium tetraoxide.

It is desirable that the copolymer (C) contains from 25 to 70% by weight of the rubber particles, the rest being a mixture of the vinyl aromatic compound and the unsaturated nitrile compound constituting the matrix. If the amount of the rubber exceeds 70% by weight, the blending with other copolymers will be difficult, and the surface gloss of the final composition will be poor. On the other hand, if the amount of the rubber is less than 25% by weight, the impact resistance and moldability of the final composition will be poor.

The matrix resin suitably comprises from 90 to 40% of the vinyl aromatic compound residues, the rest being the unsaturated nitrile compound residues. If the composition of the matrix resin is outside the above range, the compatibility with other copolymers will be poor.

The copolymer (D) is preferably prepared by dissolving from 2 to 17% by weight of the rubber in the vinyl aromatic compound and the unsaturated nitrile compound and subjecting the solution to mass polymerization or mass-suspension polymerization. For the mass polymerization, an inert solvent such as pentane, hexane, benzene or xylene may be employed. If the amount of the rubber is less than 2% by weight, the impact strength of the final composition will be poor. On the other hand, if the amount of the rubber exceeds 17% by weight, the viscosity of the rubber solution tends to be high, whereby the control of the polymerization reaction becomes difficult, and the outer appearance of the resulting copolymer tends to be inferior.

The amounts of the residues of the vinyl aromatic compound and unsaturated nitrile compound in the matrix resin and the glass transition temperature of the rubber, may be the same as those in the copolymer (C).

The average particle size of the rubber in the copolymer (D) is from 0.7 to 4 μm, preferably from 1.5 to 3.0 μm. If the average particle size of the rubber is less than 0.7 μm, the impact strength of the final composition will be inadequate, and if the average particle size exceeds 4 μm, there will be an adverse effect to the outer appearance of a molded product, such as a deterioration of the gloss or the formation of flow marks.

The "average particle size" of the rubber particles in the copolymer (D) is a weight average particle size as measured "Coulter Counter Model TA II" manufactured by Coulter Electronics Limited.

The composition of the present invention comprises from 10 to 90 parts by weight of the copolymer (A), from 0 to 50 parts by weight of the copolymer (B), from 5 to 89 parts by weight of the copolymer (C) and from 1 to 45 parts by weight of the copolymer (D), wherein the proportion of the copolymer (C) in the total amounts of the copolymers (C) and (D) is from 97 to 50% by weight.

If the copolymer (A) is less than 10 parts by weight, the heat resistance will be inadequate, and if it exceeds 90 parts by weight, the impact resistance will be poor. If the amounts of the copolymers (B), (C) and (D) exceed the upper limits of the above ranges, heat resistance will be poor. On the other hand, if the amount of the copolymers (C) and (D) are less than the lower limits of the above ranges, the mechanical properties such as the impact resistance will be poor.

If the proportion of the copolymer (C) in the total amounts of the copolymers (C) and (D) exceeds 97% by weight, the impact strength will be inadequate, and if the proportion is less than 50% by weight, the outer appearance and heat resistance of the final composition will be poor.

To the heat resistant resin composition of the present invention, there may be added, as the case requirs, various additives such as an antioxidant, an ultraviolet absorber, a releasing agent, an antistatic agent or coloring agent, which are commonly employed for the preparation of usual thermoplastic resins.

The heat resistant resin composition of the present invention has the following features, and its value for practical application is extremely great.

(1) It has heat resistance superior to the conventional styrene-type impact resistant resins.

(2) It is superior in the heat stability at a high temperature to the conventional styrene-maleic anhydride-type impact resistant resins, whereby the molding process such as injection molding, vacuum molding or press molding, can be conducted within a wide temperature range.

(3) It is superior in the impact resistance, particularly in the FDI.

(4) It provides the molded product which has a good outer appearance comparable to an ABS resin.

Now, the present invention will be described in further detail with reference to Examples and Comparative Examples. However, it should be understood that the present invention is by no means restricted by these specific Examples. The various properties of the composition were measured by the following method.

| Izod impact strength | JIS K-6871 |
|---|---|
| Vicat softening temperature | JIS K-6870 |
| FDI | A weight having a predetermined weight was secured to a dart having a ball point of a diameter of ½ inch, and the dart was dropped from a predetermined height, to the center of a sample plate having a thickness of 2.5 mm |

-continued whereby the crack-forming condition was measured. (20 test pieces were employed for the test of each sample.)

PREPARATION EXAMPLE (1) Preparation of copolymers (A) and (B)

Into a 300 l polymerization reactor, 69 kg of styrene and 1.9 kg of maleic anhydride were fed, and the temperature was raised to 95° C. under stirring in a nitrogen atmosphere. While continuously adding to this system, liquid maleic anhydride maintained at a temperature of 70° C. in a total amount of 10 kg at a constant supply rate, mass polymerization was conducted at 95° C. for 460 minutes. At the completion of the continuous addition, the conversion was 44% by weight and the content of the maleic anhydride residues in the resulting copolymer was 31%. To this system, 21 kg of acrylonitrile was added in 20 minutes, and while maintaining the temperature of the system at 90° C., the stirring was continued for further 20 minutes. At this stage, the concentration of the maleic anhydride in the monomers was not more than 0.1%.

To this system, 30 g of a polyvinyl alcohol-type suspension agent, 30 g of a polyacrylic acid ester-type suspension agent and 70 kg of water containing 300 g of sodium sulfate, were added to bring the system in a suspension state. This suspension was heated to 110° C., and stripping was conducted for 120 minutes at 110° C. Then, 8 kg of acrylonitrile was added. The temperature was raised to 150° C. in 60 minutes, and stripping was again conducted at this temperature for 120 minutes. Then, 7 kg of aniline and 2 kg of 25% aqueous ammonia, were added thereto, and the imidization reaction was conducted at 155° C. for 120 minutes. The polymer thereby obtained in the form of beads, was washed with water, dried and then pelletized by an extruder.

The pellets were analyzed and thereby found to be a mixture comprising 76% by weight of a copolymer (A) composed of 27% N-phenylmaleimide residues, 4% of maleimide residues and 69% of styrene residues, and 24% by weight of a copolymer (B) composed of 41% of acrylonitrile residues and 59% of styrene residues.

(2) Preparation of copolymer (C)

Three different types of graft copolymers having the rubber compositions, the rubber contents, the rubber particle sizes and the styrene-acrylonitrile ratios as identified in Table 1, were prepared by usual emulsion polymerization.

(3) Preparation of copolymer (D)

Four different types of graft copolymers having the rubber compositions, the rubber contents, the rubber particle sizes and the styrene-acrylonitrile ratios as identified in Table 2, were prepared by usual mass-suspension polymerization.

TABLE 1

| Rubber composition | Polymer $C_1$ Butadiene/ acrylonitrile copolymer (93:7) | Polymer $C_2$ Butadiene/ styrene copolymer (90:10) | Polymer $C_3$ Butylacrylate/ acrylonitrile copolymer (95:5) |
|---|---|---|---|
| Rubber content (% by weight) | 38.5 | 38.5 | 40.0 |
| Average particle size of rubber in the rubber-dispersed phase (μm) | 0.14 | 0.30 | 0.24 |
| Styrene/acrylonitrile ratio (weight ratio) | 70/30 | 70/30 | 70/30 |

TABLE 2

| Rubber composition | Polymer $D_1$ Polybutadiene | Polymer $D_2$ Polybutadiene | Polymer $D_3$ Polybutadiene | Polymer $D_4$[1] EPDM[2] |
|---|---|---|---|---|
| Rubber content (% by weight) | 14 | 14 | 14 | 14 |
| Average particle size of rubber in the rubber-dispersed phase (μm) | 1.0 | 1.9 | 3.1 | 1.5 |
| Styrene/acrylonitrile ratio (weight ratio) | 75/25 | 75/25 | 75/75 | 70/30 |

[1]Prepared in accordance with the method disclosed in Japanese Examined Patent Publication No. 18474/1974.
[2]EP-33 manufactured by Nippon EP Rubber Co. Ltd., was used.

EXAMPLES 1 to 8

Mixtures of the copolymers were respectively kneaded and pelletized in the proportions as identified in Table 3, by an extruder. The physical properties of the compositions thereby obtained are shown in Table 3.

TABLE 3

| | Example Nos. | | | | | | | |
|---|---|---|---|---|---|---|---|---|
| | 1 | 2 | 3 | 4 | 5 | 6 | 7 | 8 |
| Proportions (parts by weight) | | | | | | | | |
| Copolymer (A) | 32 | 39 | 32 | 39 | 32 | 37 | 27 | 39.5 |
| Copolymer (B) | 10 | 12 | 10 | 12 | 10 | 12 | 9 | 12.5 |
| Copolymer (C) | | | | | | | | |
| Polymer $C_1$ | 39 | 33 | | | | | | |
| Polymer $C_2$ | | | 39 | 33 | 39 | 31 | | |
| Polymer $C_3$ | | | | | | | 43 | 32 |
| Copolymer (D) | | | | | | | | |
| Polymer $D_1$ | 19 | | 19 | | | | | |
| Polymer $D_2$ | | 16 | | 16 | 19 | | | |
| Polymer $D_3$ | | | | | | 20 | | |
| Polymer $D_4$ | | | | | | | 21 | 16 |
| Physical properties | | | | | | | | |
| Vicat softening temperature (°C.) | 117 | 121 | 116 | 119 | 115 | 119 | 105 | 120 |
| Izod impact strength (kg-cm/cm notch) | 16 | 14 | 16 | 14 | 17 | 13 | 18 | 10 |
| FDI (kg-cm) | 100 | 71 | 80 | 140 | 180 | 70 | 150 | 70 |
| Gloss* (Determined by naked | | | | | | | | |

TABLE 3-continued

|  | Example Nos. | | | | | | | |
| --- | --- | --- | --- | --- | --- | --- | --- | --- |
|  | 1 | 2 | 3 | 4 | 5 | 6 | 7 | 8 |
| eyes) | | | | | | | | |

*The gloss of a molded product was determined by naked eyes in accordance with the following evaluation standards:
 Excellent
 Good
 Δ Slightly inferior
 X Inferior

COMPARATIVE EXAMPLES 1 to 6

Mixtures of the copolymers were kneaded and pelletized in the propotions as identified in Table 4, by an extruder. The physical properties of the compositions thereby obtained are shown in Table 4.

TABLE 4

|  | Comparative Example Nos. | | | | | |
| --- | --- | --- | --- | --- | --- | --- |
|  | 1 | 2 | 3 | 4 | 5 | 6 |
| Proporitions (parts by weight) | | | | | | |
| Copolymer (A) | 46 | 46 | 41 | 40 | 38 | 47.5 |
| Copolymer (B) | 15 | 15 | 13 | 13 | 12 | 15 |
| Copolymer (C) | | | | | | |
| Polymer $C_1$ | 39 | | | | | |
| Polymer $C_2$ | | 39 | 46 | 46 | | |
| Polymer $C_3$ | | | | | 50 | 37.5 |
| Copolymer (D) | | | | | | |
| Polymer $D_2$ | | | | 1 | | |
| Physical properties | | | | | | |
| Vicat softening temperature (°C.) | 125 | 123 | 120 | 119 | 118 | 123 |
| Izod impact strength (kg-cm/cm notch) | 9 | 10 | 13 | 14 | 5 | 4 |
| FDI (kg-cm) | <10 | <10 | 20 | 20 | 15 | <10 |
| Gloss (Determined by naked eyes) | | | Δ | Δ | | Δ |

COMPARATIVE EXAMPLES 7 to 9

Various mixtures of the copolymers as identified in Table 5 were respectively blended and pelletized in the same manner as in the preceeding Examples. As the copolymer (D), Polymer $D_5$ (average particle size of rubber; 7.8 μm) i.e. a graft copolymer similar to Polymers $D_1$, $D_2$ and $D_3$ except for the average particle size of the rubber, was used. The copolymers (A), (B) and (C) used, were the same as those used in the preceeding Examples. The physical properties of the compositios thereby obtained are shown in Table 5.

TABLE 5

|  | Comparative Example Nos. | | |
| --- | --- | --- | --- |
|  | 7 | 8 | 9 |
| Proportions (parts by weight) | | | |
| Copolymer (A) | 39 | 39 | 32 |
| Copolymer (B) | 12 | 12 | 10 |
| Copolymer (C) | | | |
| Polymer $C_1$ | 33 | | |
| Polymer $C_2$ | | 33 | 39 |
| Copolymer (D) | | | |
| Polymer $D_5$ | 16 | 16 | 19 |
| Physical properties | | | |
| Vicat softening temperature (°C.) | 119 | 119 | 113 |
| Izod impact strength (kg-cm/cm notch) | 12 | 11 | 14 |
| FDI (kg-cm) | 40 | 35 | 65 |
| Gloss (Determined by naked eyes) | X | X | X |

We claim:

1. A heat and impact resistant resin composition which comprises from 10 to 90 parts by weight of a copolymer (A) comprising from 90 to 50% of residues of a vinyl aromatic compound selected from the group consisting of styrene, α-methylstyrene, p-methylstyrene, t-butylstyrene and a halogenated styrene, from 10 to 50% of residues of a maleimide compound and from 0 to 30% of residues of a vinyl compound copolymerizable therewith; from 0 to 50 parts by weight of a copolymer (B) comprising from 90 to 40% of residues of a vinyl aromatic compound as defined above and from 10 to 60% of residues of an unsaturated nitrile compound selected from the group consisting of acrylonitrile, methacrylonitrile and a mixture thereof; from 5 to 89 parts by weight of a graft copolymer (C) produced by polymerizing from 25 to 70% by weight of particles of a rubber latex selected from the group consisting of polybutadiene, a styrene-butadiene copolymer, an acrylonitrile-butadiene copolymer, a homopolymer or copolymer of an alkyl acrylate, an ethylene-propylene copolymer and an ethylene propylene-non-conjugated diene terpolymer, said rubber latex having a glass transition temperature of not higher than 0° C. and an average particle size of from 0.1 to 0.5 μm with from 75 to 30% by weight of a resin comprising from 90 to 40% of residues of the vinyl aromatic compound as defined for copolymer (A) and from 10 to 60% of residues of an unsaturated nitrile compound selected from the group consisting of acrylonitrile, methacrylonitrile and a mixture thereof; and from 1 to 45 parts by weight of a graft copolymer (D) produced by polymerizing from 2 to 17% by weight of particles of a rubber latex as defined above having a glass transition temperature of not higher than 0° C. and an average particle size of from 0.7 to 4 μm, with from 98 to 83% by weight of a resin comprising from 90 to 40% of residues of the vinyl aromatic compound as defined for copolymer (A) and from 10 to 60% of residues of the unsaturated nitrile compound as defined for graft copolymer (C), wherein the amount of the graft copolymer (C) is from 97 to 50% by weight of the total amounts of the graft copolymers (C) and (D).

2. The composition according to claim 1, wherein the rubber latex is selected from the group consisting of the polybutadiene, the copolymer having therein at least 50% by weight of butadiene units and a mixture thereof.

3. The composition according to claim 1, wherein the maleimide compound is selected from the group of consisting of maleimide, N-alkylmaleimide and N-arylmaleimide.

4. The composition according to claim 1, wherein said graft copolymer (C) is prepared by the emulsion polymerization of the vinyl aromatic compound and the unsaturated nitrile compound in the presence of a rubber latex.

5. The composition according to claim 1, wherein said graft copolymer (D) is prepared by subjecting said rubber, vinyl aromatic compound and the unsaturated nitrile compound to mass polymerization or mass-suspension polymerization.

6. The composition according to claim 1, wherein said rubber latex alkyl acrylate homopolymer or copolymer is polybutyl acrylate, polypentyl acrylate or polyhexyl acrylate.

7. The composition according to claim 3, wherein said N-arylmaleimide compound is N-phenylmaleimide.

* * * * *